March 6, 1951 H. W. ROCKWELL 2,543,989
HYDRAULIC SYSTEM FOR OPERATING HYDRAULIC
CYLINDERS AND PISTONS
Filed Feb. 28, 1945 12 Sheets-Sheet 4
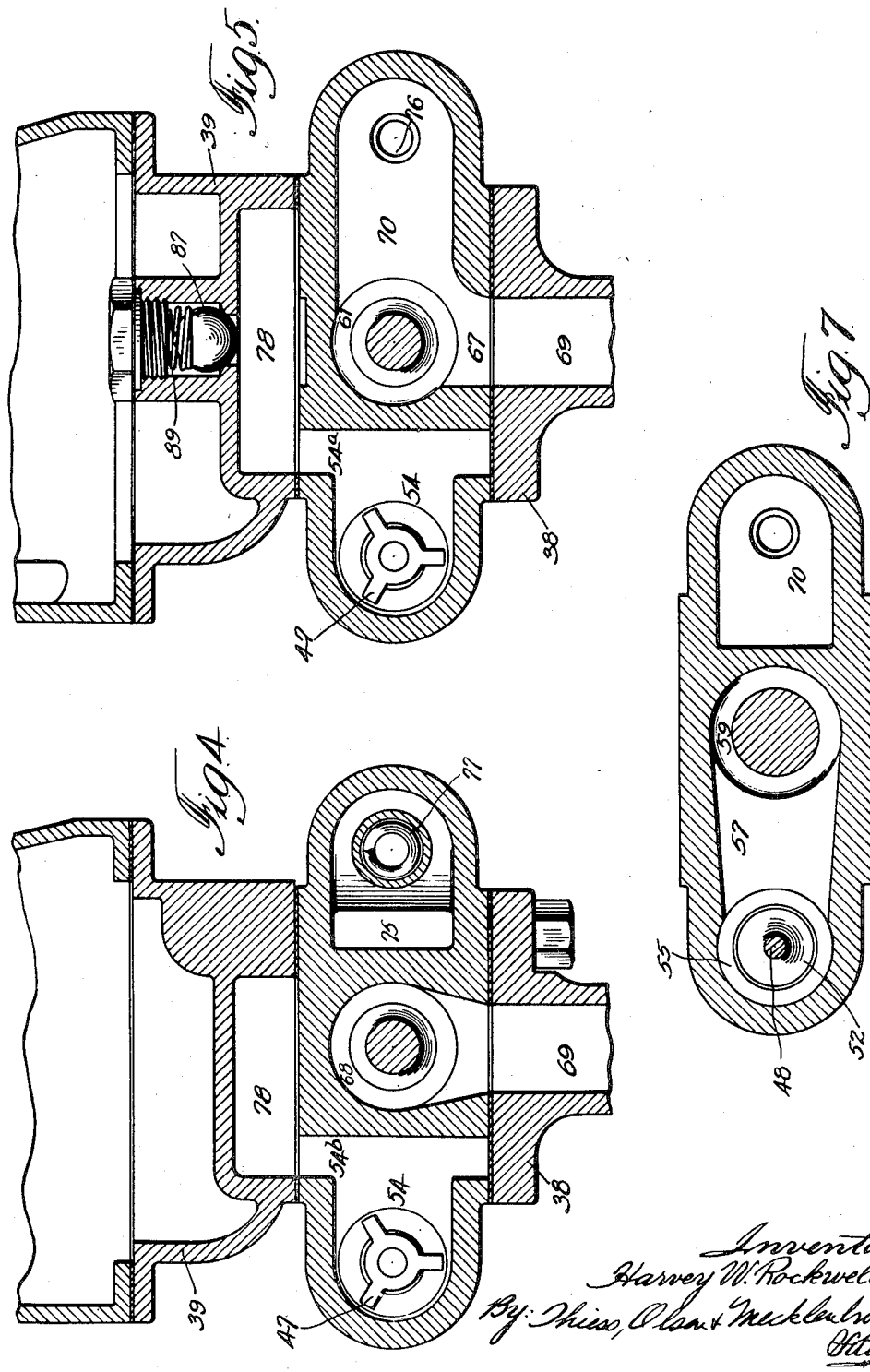
Inventor:
Harvey W. Rockwell.
By: Thiess, Olson & Mecklenburger
Attys March 6, 1951

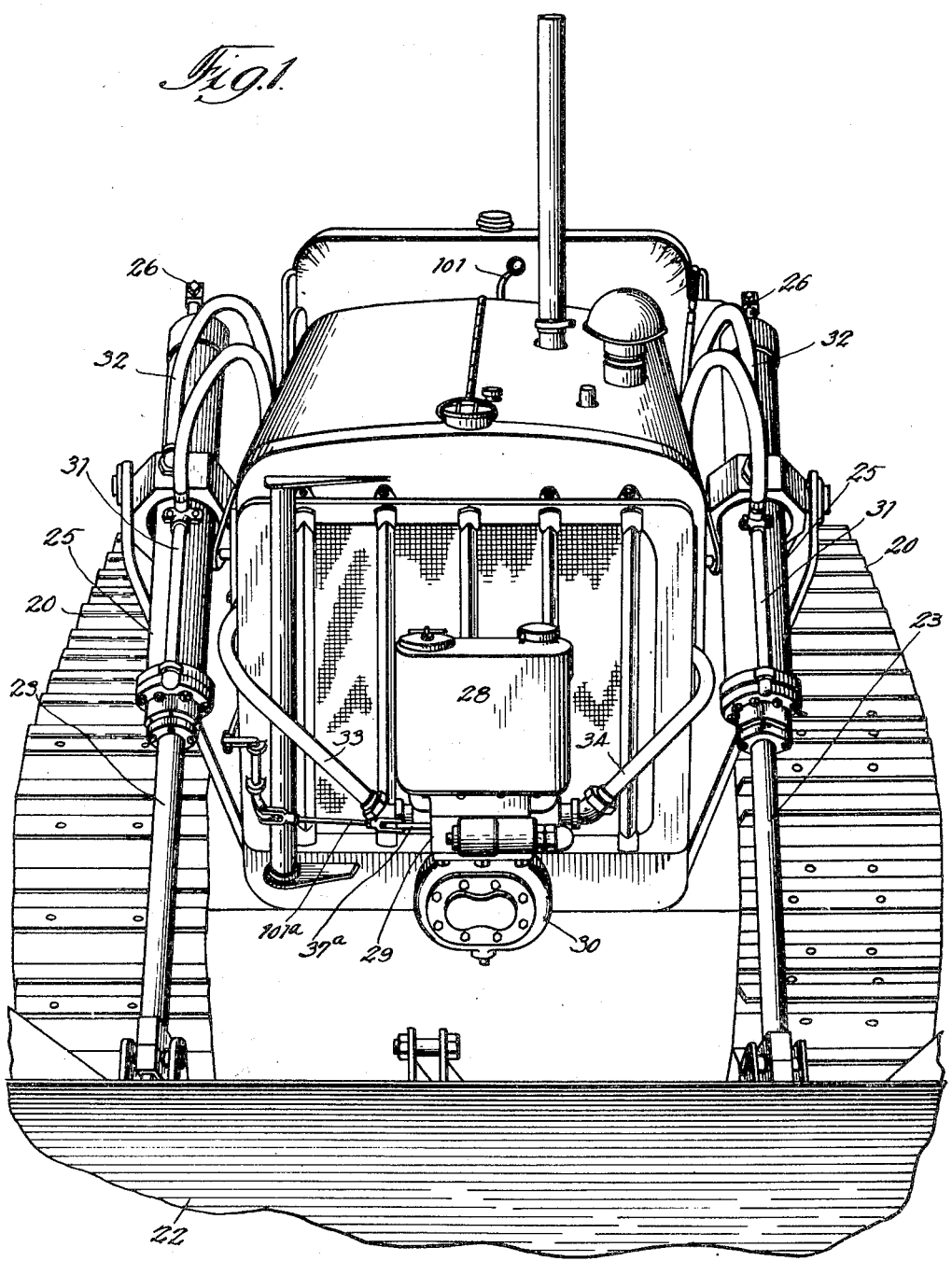

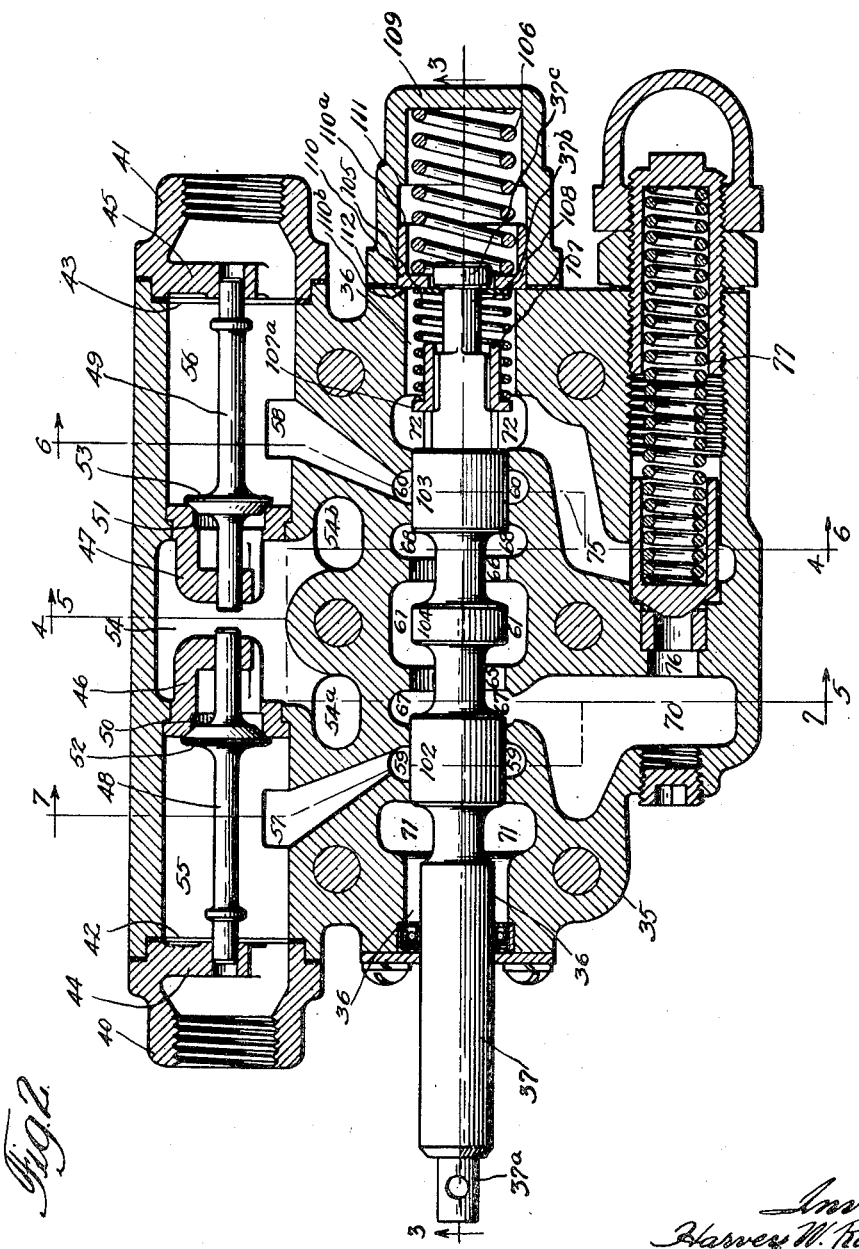

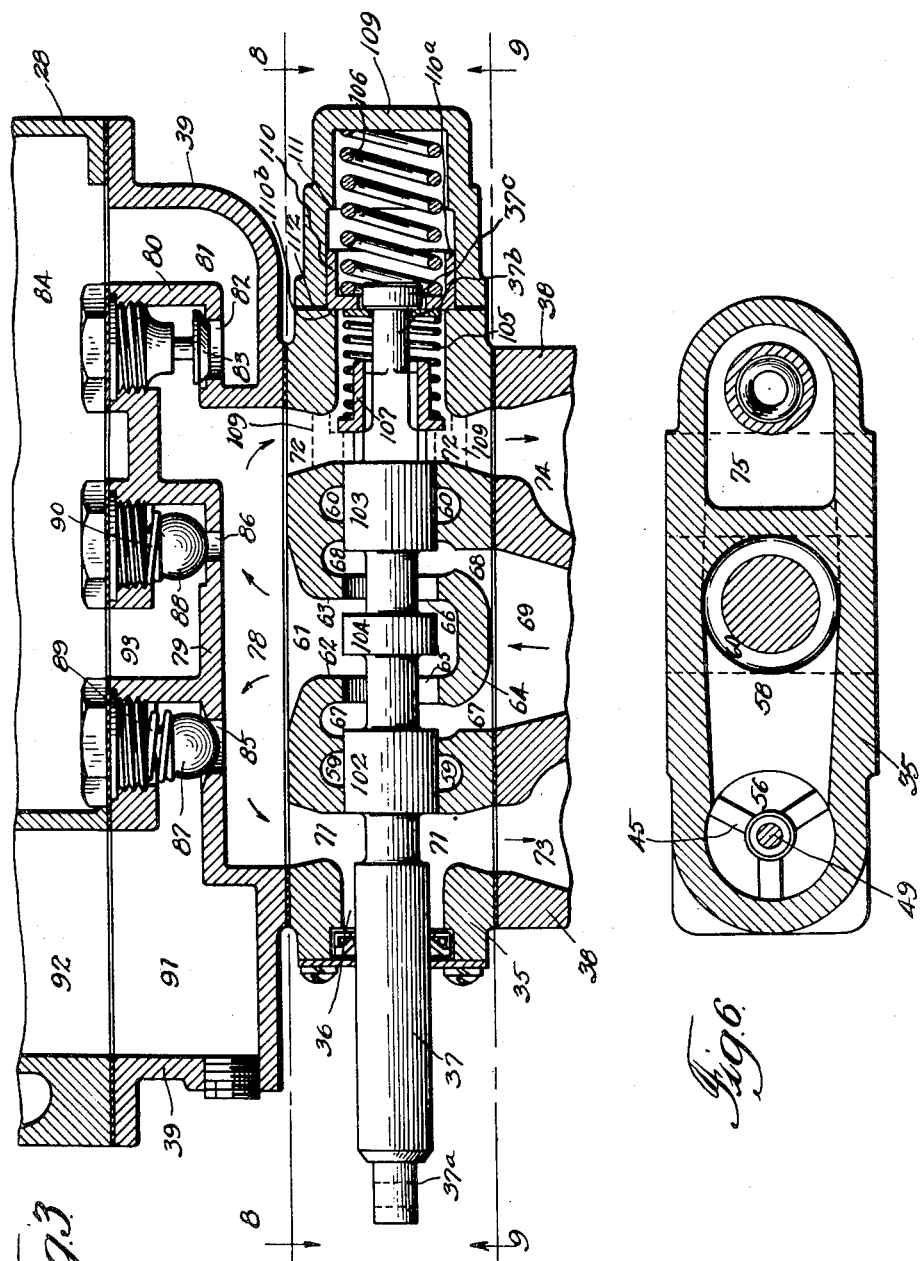

H. W. ROCKWELL 2,543,989

HYDRAULIC SYSTEM FOR OPERATING HYDRAULIC
CYLINDERS AND PISTONS

Filed Feb. 28, 1945

Inventor:
Harvey W. Rockwell
By: Thiess, Olsen & Mecklenburger
Attys

March 6, 1951 H. W. ROCKWELL 2,543,989
HYDRAULIC SYSTEM FOR OPERATING HYDRAULIC
CYLINDERS AND PISTONS
Filed Feb. 28, 1945 12 Sheets-Sheet 8

Inventor:
Harvey W. Rockwell.
By Thiess, Olson & Mecklenburger
Attys.

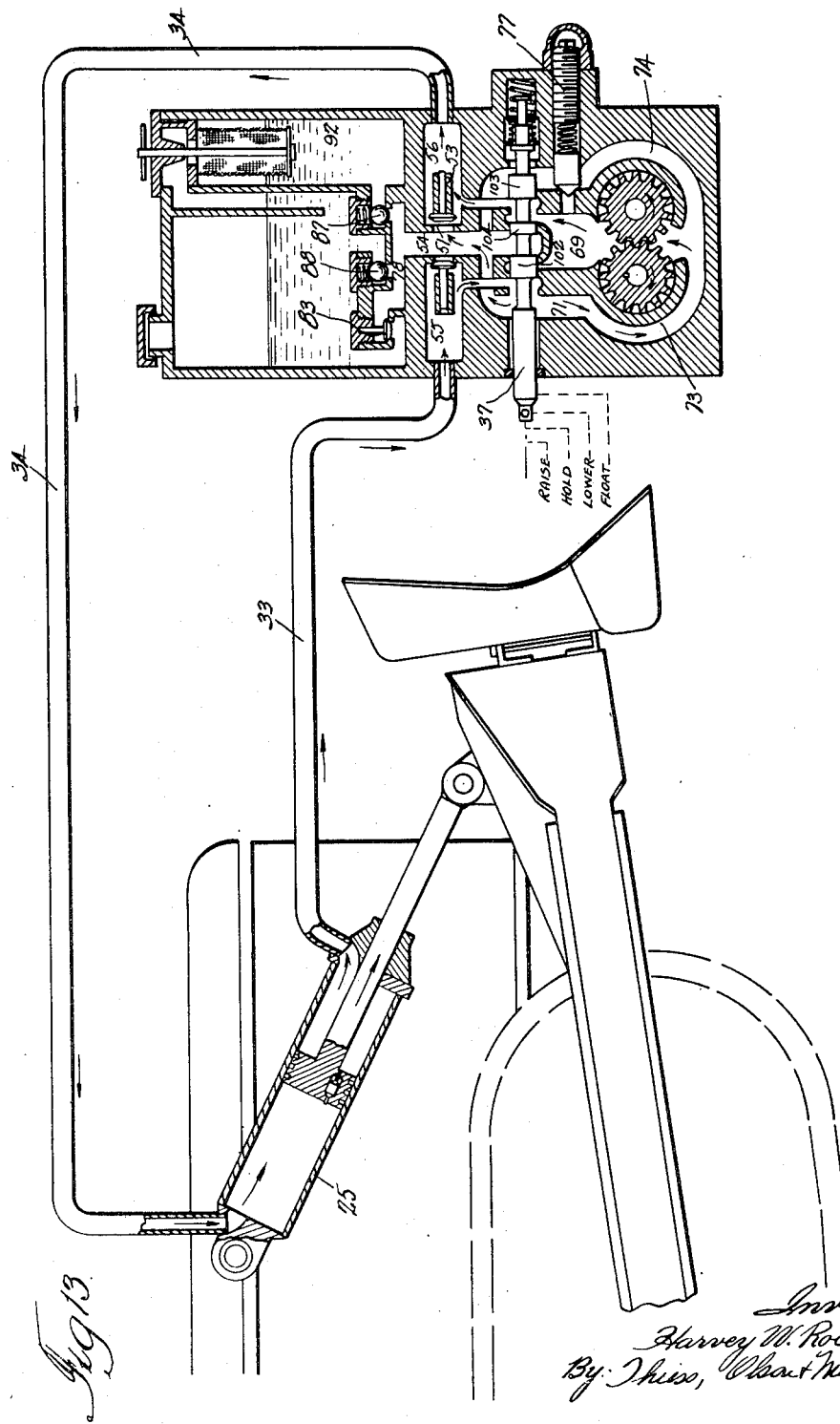

March 6, 1951     H. W. ROCKWELL     2,543,989
HYDRAULIC SYSTEM FOR OPERATING HYDRAULIC
CYLINDERS AND PISTONS
Filed Feb. 28, 1945     12 Sheets-Sheet 10
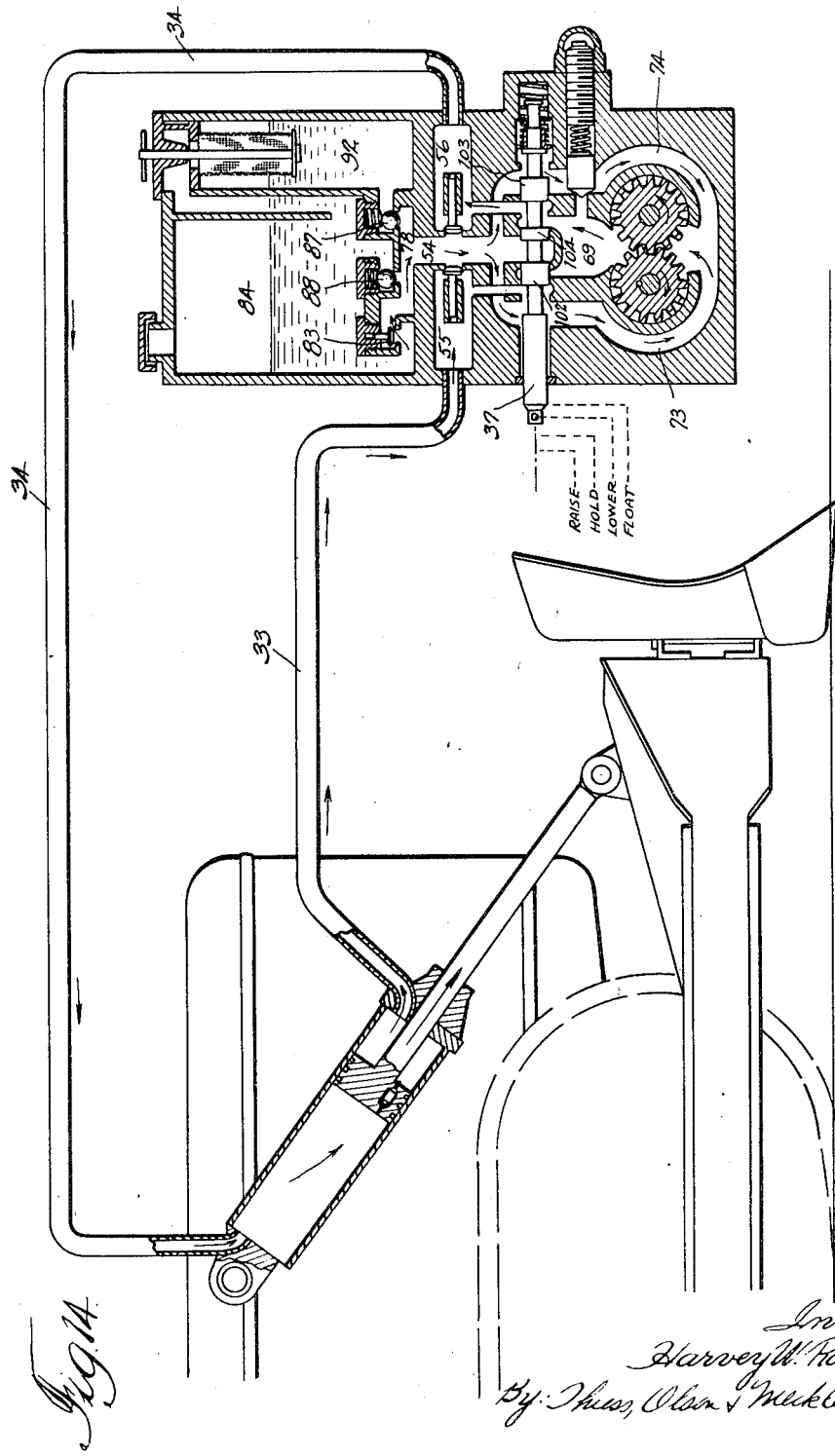

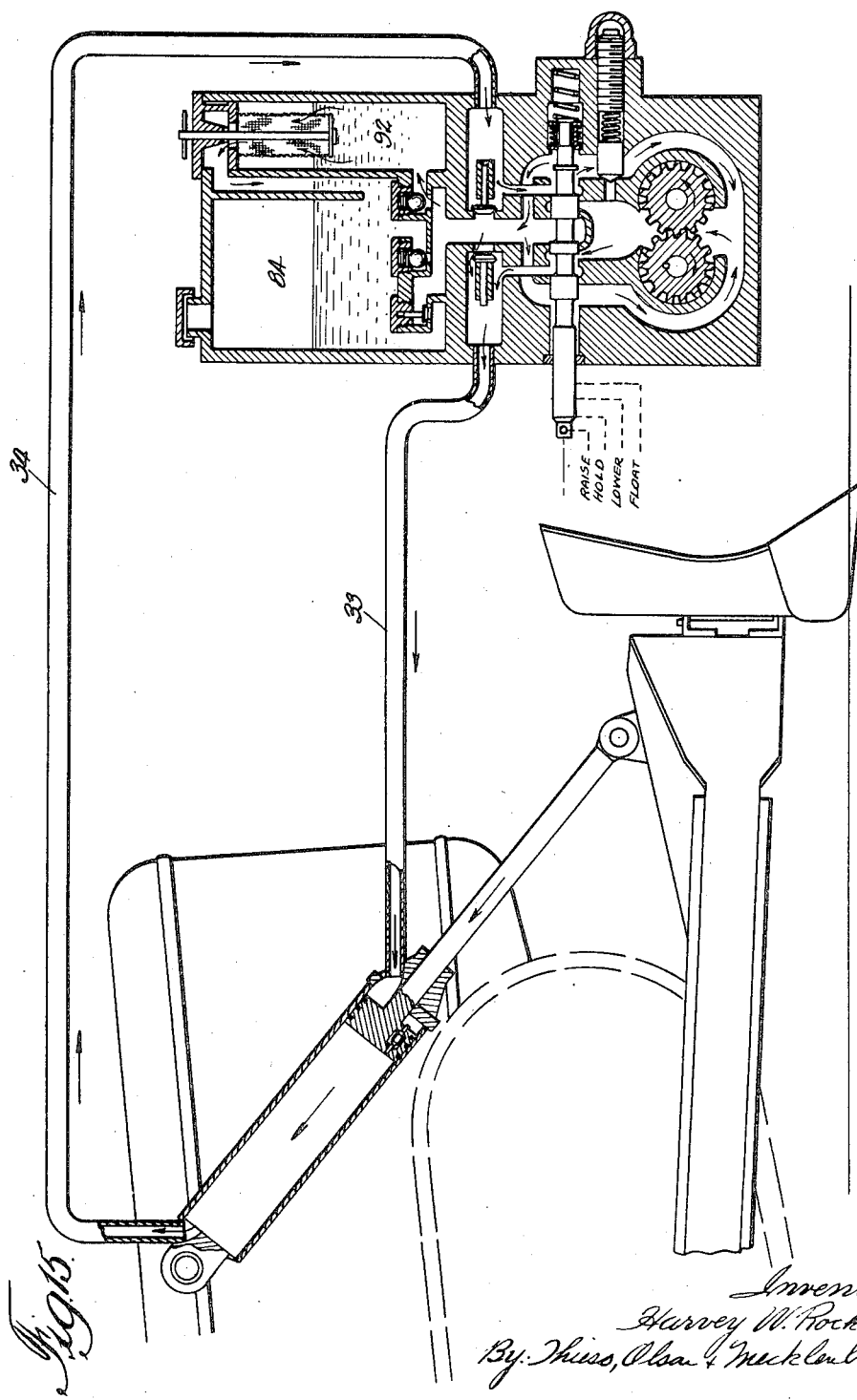

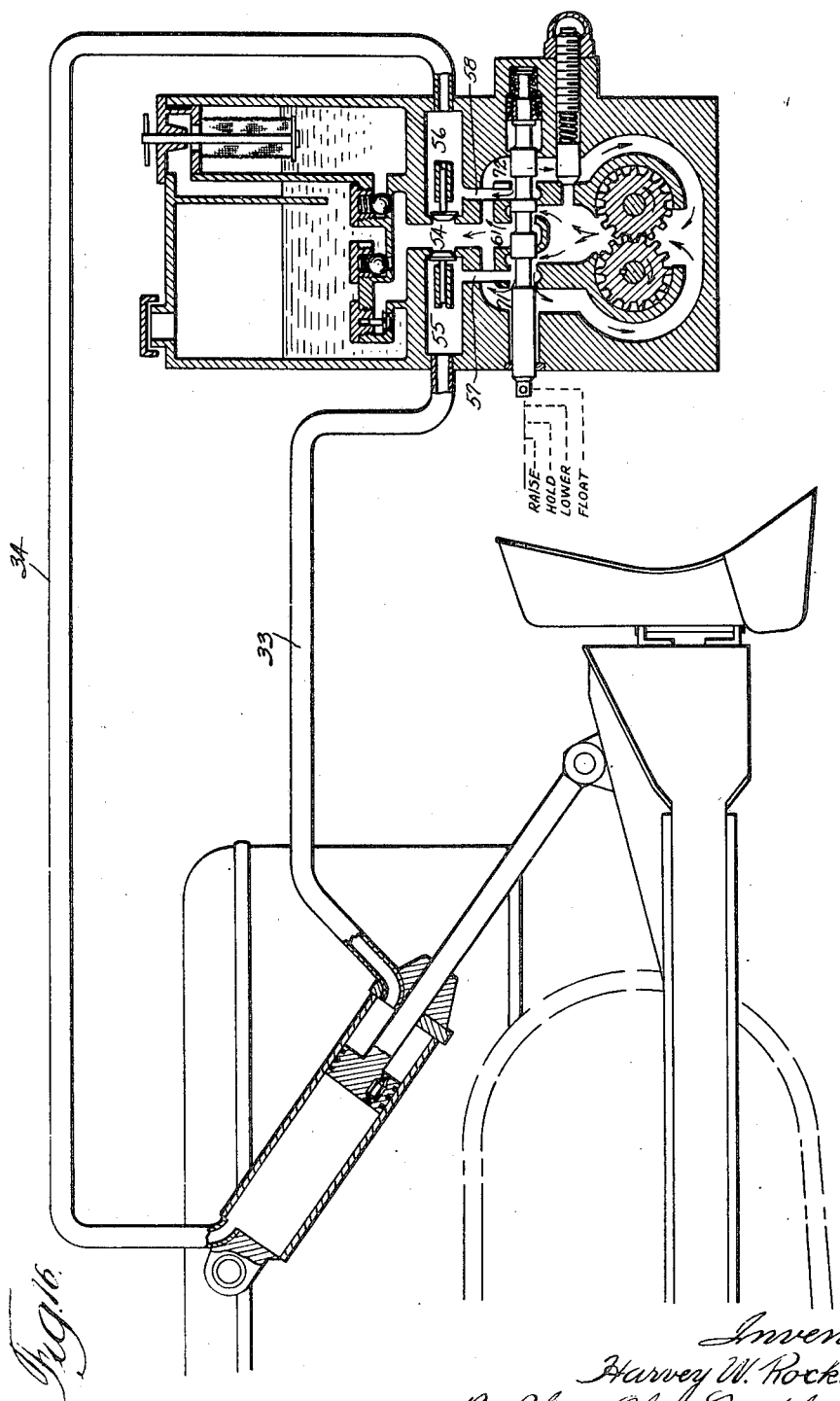

Patented Mar. 6, 1951

2,543,989

UNITED STATES PATENT OFFICE 2,543,989

HYDRAULIC SYSTEM FOR OPERATING HYDRAULIC CYLINDERS AND PISTONS

Harvey W. Rockwell, Cedar Rapids, Iowa, assignor to La Plant-Choate Manufacturing Co., Inc., Cedar Rapids, Iowa, a corporation of Delaware Application February 28, 1945, Serial No. 580,121

21 Claims. (Cl. 60—52)

This invention relates to hydraulic systems comprising means for translating fluid under pressure into mechanical force for controlling the movement of machine elements such as are included in an earth-working machine similar to a bulldozer and to methods of operating such systems. The hydraulic system includes a pump arranged to be driven from the engine crankshaft of a tractor or other propelling means which may be included in the machine to which the hydraulic unit is attached, a reservoir for holding a reserve supply of fluid, and a system of valves controlling the flow of fluid to motors or jacks such as piston cylinders which latter in turn are connected to move the desired machine elements. The invention is illustrated as used in a bulldozer wherein the blade or mold board is connected to the jack piston rods.

One of the principal objects of this invention is to incorporate the companion elements of a hydraulic system in as small and compact a unit as possible, thereby to permit the mounting of the unit at the front of a tractor or bulldozer assembly with minimum complication of design. Heretofore it has been impossible sufficiently to compact the assemblies embodied in hydraulic systems because of certain apparently irreconcilable requirements. These latter are particularly present when the hydraulic system is used with a bulldozer or other earth-working machine wherein cylinder jacks are supplied with fluid under varying pressure and the pistons in the jacks are attached to the outboard ends of an earth-working element, such as a bulldozer blade or mold board.

The elements of the hydraulic system comprises a pump, a directional control valve and a fluid reservoir. It is believed that the arrangement of valves in the about-to-be described system is unique and is the principal reason why one or more of the assemblies can be greatly decreased in size as compared with similar previously used assemblies. For instance, the unit is greatly compacted because of the use of a relatively small fluid reservoir, the latter being much smaller than has heretofore been thought possible. The reasons why the fluid reservoir of the here disclosed hydraulic system can be made thus abnormally small will be better understood as the system as a whole is described. The hereinafter explained valvular system is such that the reservoir need only be large enough to take care of the difference in piston rod displacement within the jacks, this difference arising from the presence of the piston rod one one side of the piston and not on the other. In the normal presently used hydraulic systems adapted to supply fluid to such jacks a large reservoir is now necessary to take care of the conditions caused by the external loading of the jacks.

When the jack pistons are attached to a heavy load, i. e., a bulldozer mold board or blade, and external forces cause sudden rises and falls of the heavy blade, the operating fluid is forced violently out of one end of the jack by the moving piston. Presumably such fluid should flow immediately into the other jack end. Such undisturbed fluid interchange between the jack ends does not, however, take place. When the heavy blade falls, the piston forces the oil out of the jack much faster than it can be guided back into the cavity behind the piston, i. e., into the other end of the jack. Thus the displaced fluid has to be taken care of in a fluid reservoir which must be made abnormally large properly to take care of said displaced fluid.

The necessity of using such a large reservoir eventuates a further complication and this wholly in addition to the increased bulk and cost of the reservoir assembly. The just referred to temporary fluid excess is forced into the reservoir with great violence, thereby causing undue turbulence within the reservoir and setting up an accumulative foaming condition in the oil. The latter greatly reduces the working efficiency of the system, causing the oil to spill over through the breather and even forcing the foam gradually through the pump and into the cylinders.

When closed hydraulic systems are used to operate machines as here described, it is entirely unreasonable to expect the aforesaid abnormal conditions not to occur. Experience has proven that they are constantly encountered. Of course, if the system could be always operated sufficiently carefully that the fluid excess could be passed slowly through the valve system, the necessity for the here described valvular control might not arise. However, no such optimum conditions can be uniformly anticipated. Up to now an oversize reservoir has been regarded as a necessary evil. Manufacturers apparently have not sufficiently analyzed the reasons for the above described difficulties to be able so to present the problem that the art has been able to invent means to avoid the same and concurrently to reduce the size and weight of the hydraulic system as a whole.

One incidental but nevertheless novel feature which is secured by using the hereafter described valve system is the construction of the unit reservoir with a very small breather. The possibility of cutting down the breather area results in a major reduction in the amount of foreign matter which can enter the reservoir and this in turn so far eliminates hydraulic fluid contamination that a marked increase of the wearability of the various operating parts is secured. Such limited breather area is, however, only possible because the reservoir size has been so greatly decreased.

The advantages attainable through the use of applicant's unique combination of the various elements of the system will be even better understood as a description of the mechanism and the method of operating the same proceeds.

In the drawings,

Fig. 1 is an elevational perspective view of the forward end of a tractor and bulldozer with a hydraulic unit mounted thereupon, it being noted that the latter unit includes (from top to bottom) a reservoir assembly, a control valve assembly and a pump;

Fig. 2 is a horizontal or plan cross-sectional view taken through the valve assembly on substantially the central horizontal plane thereof, i. e., horizontally of the spool of the main control valve;

Fig. 3 is an elevational sectional view taken on the line 3—3 in Fig. 2, it being noted, however, that sufficient of the bottom portion of the reservoir and of the top portion of the pump are included to illustrate how the joinder of the three uniquely interiorly formed assemblies eventuates the fluid passages through the unit as a whole;

Figure 8:
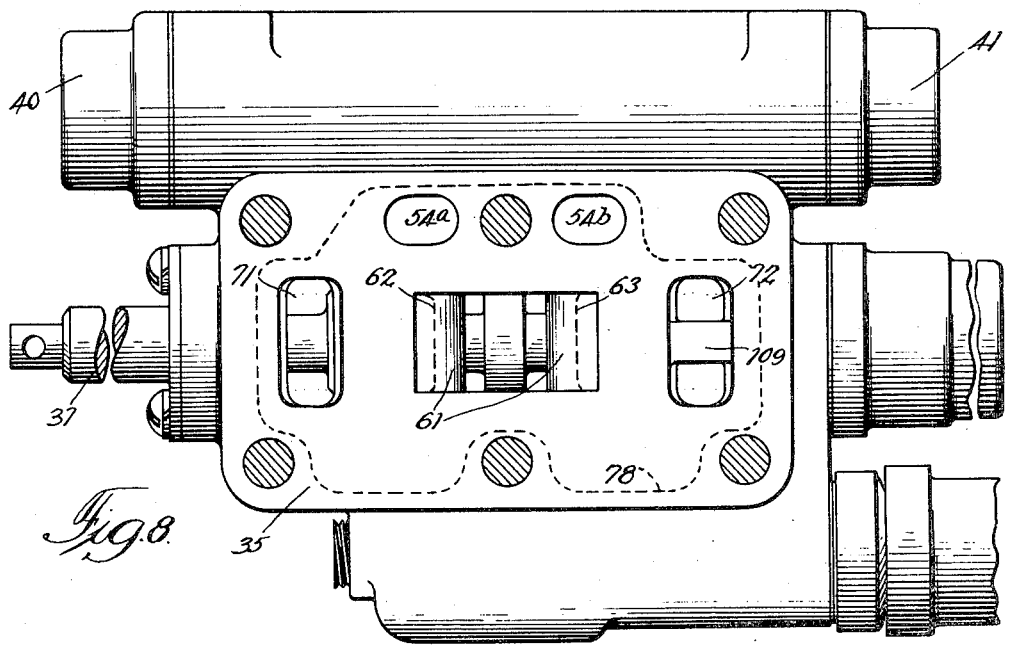
Figure 9:
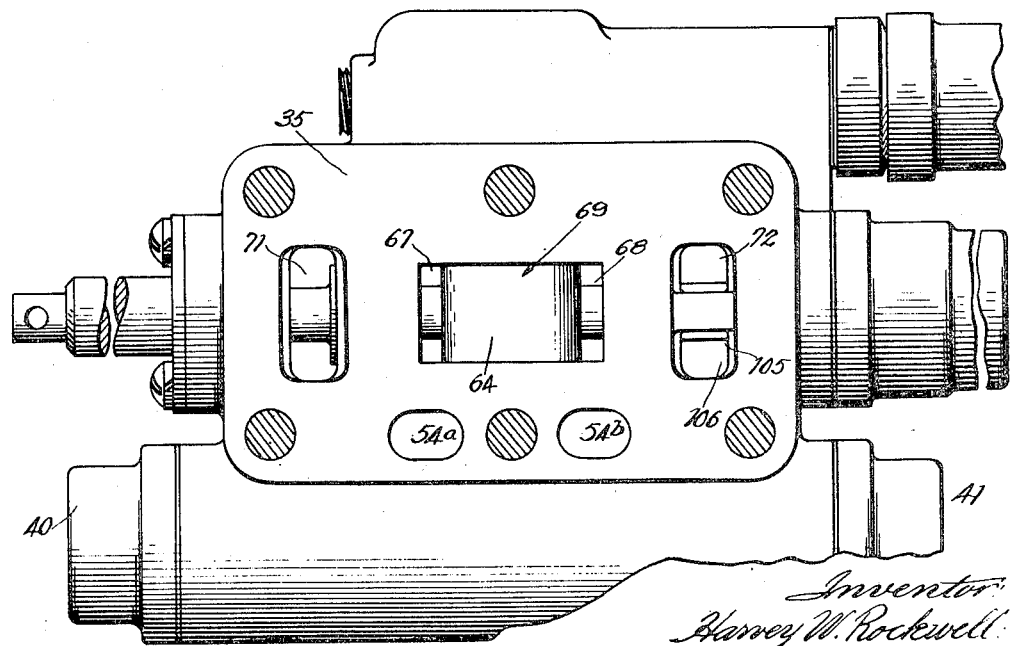

Figs. 4 and 5 are elevational sectional views on the lines 4—4 and 5—5, respectively, of Fig. 2, portions of the reservoir and pump again being included for the foregoing indicated purpose;

Figs. 6 and 7 are elevational sectional views on the lines 6—6 and 7—7, respectively, of Fig. 2, it not being deemed necessary to include any showing of the reservoir and pump assemblies;

Figs. 8 and 9 are top and bottom plan views, respectively, of the valve assembly, that is, they are plan sectional views on the lines 8—8 and 9—9, respectively, of Fig. 3; and Figs. 10 to 16, inclusive, comprise somewhat diagrammatic elevational showings of the pump, valve and reservoir of the hydraulic unit together with the pipe connections from this unit to the jacks which raise and lower the bulldozer blade, the assemblies being depicted in vertical section with all of the valves and fluid passages being thrown into a single centrally disposed vertical plane to best illustrate the operation of the system, and the control valve and movable blade being shown in various changed positions to illustrate the character of fluid flow under the various operational conditions which may be encountered.

It must be understood that the hydraulic unit structure shown in Figs. 10-16 does not precisely conform to the structural form of the various elements of the unit, but that the same are used more clearly and unitarily to illustrate the path of fluid flow through the assembly as a whole, thereby overcoming any difficulties in understanding which might arise if only the views of Figs. 2-9 were available. However, the illustrations of Figs. 10-16 are in a great many respects, except for structural variations within the skill of the layman, a proper showing of the mechanisms themselves. As the description of the structure and the method of operating the same proceeds, it will be found that one liberty which has been taken so far as structure is concerned is that of showing certain valves one above the other rather than in a horizontal plane, as they are really arranged to promote the aforesaid compacting of the valve assembly unit, also the indication of continuous fluid passages in a single plane whereas many of the latter are in fact, as shown in Figs. 2-9, made up of passages in more than one plane and comprehend coacting spaces in more than one assembly. It is of course intended that the Figs. 2-9 illustration shall govern if any dissimilarity seems to exist between the structural and the diagrammatic showings.

However, the vertical section in Figs. 10-16 of the oil reservoir and of the interior construction thereof illustrates with substantial fidelity the actual structure. Again the vertical sectional showing at the bottom of Figs. 10-16, i. e., that of the pump assembly, is also substantially structurally correct. The arrangement of the reservoir assembly, the valve assembly and the pump assembly, one above the other, and the 180° turning of the oil reservoir about a vertical axis in Figs. 10-16, inclusive, as compared with the positioning thereof in Fig. 1 permits the connection of the fluid pipes to the bottom and top of the cylinder in Figs. 10-16, inclusive, without the necessity of crossing these pipes, thereby further enhancing the simplicity of the showing and yet retaining all of the essential elements in such combination as to support claims to the broadest as well as to the most specific combination details of the structure.

The hydraulic system of the present invention is shown in Fig. 1 as mounted on a tractor and bulldozer which latter includes track members 20 and blade-carrying side members 21 between the front ends of which latter a blade 22 is mounted. The blade-carrying members 21 are pivotally mounted towards the rear of the tractor and are adapted to have their front ends pivotally moved to raise and lower the blade 22.

The raising and lowering of the blade is produced by the movement of piston rods 23 attached to pistons 24, the latter moving in cylinders 25. Inasmuch as both sides of the bulldozer blade mounting and operating mechanism are the same, for purposes of illustration the jacks, pistons and fluid connections on only one side thereof need be described in the various changed valve position illustrations of Figs. 10-16. Cylinder 25 is pivotally mounted at 26 to the frame 27 of the bulldozer so that as the blade is raised and lowered the piston may assume a substantially horizontal position in the extreme raised position of the blade (Fig. 12) and an angular position when the blade is in its lowermost position with respect to the tractor frame (Fig. 15).

The hydraulic unit comprises an oil reservoir 28, a valve assembly casing 29 and a pump assembly 30, the unit being so mounted that the drive shaft of the prime mover on the tractor and bulldozer operates the pump which will hereinafter be described, for purposes of illustration only, as a gear pump. The fluid passes to and from the cylinders 25 through pipes 31, 31 connected to the bottom or lower portions of the cylinders and pipes 32, 32 connected to the tops or upper ends of the cylinders. The pipes 31, 31 are supplied by fluid line 33 and the pipes 32, 32 by fluid line 34, which fluid lines 33 and 34 are connected into the left and right sides, respectively, of the valve assembly 29. Here again while all of the just described fluid lines and pipes are shown in Fig. 1, we will hereafter describe the operation of the system in connection with the partially diagrammatic illustrations of Figs. 10–16 by reference to the piping leading to but one cylinder 25.

A more detailed description of the reservoir assembly 28 and of the pump assembly 30 will be deferred until after the structure of the valve assembly 29 has been given, this procedure being adopted because the valve assembly structure is in fact the heart of the operating mechanism of the improved hydraulic unit and also because a description of the interior of the valve assembly will necessarily involve a description of certain of the interior structure of the bottom of the reservoir assembly and of the top of the pump assembly. This follows because the fluid passages through the unit involve portions of the reservoir assembly and of the pump assembly.

The valve assembly 29 comprises a casing 35 substantially centrally of which a cylindrical space 36 is interiorily provided with circular port-defining portions and in which a valve spool 37 is seated so that movement of the latter longitudinally of said space 36 opens and closes certain of said ports or passages. The valve assembly 29 includes, in addition to the main casing portion 35, various cap and closure members for various openings in the ends of said casing. It is not deemed necessary more specifically to refer to these than to say that they necessarily are part of the completed assembly and that their form and purpose and method of joinder to casing 35 can be readily understood from the illustrations in Figs. 2 and 3. Moreover, the means for securing the various associated structures with the valve assembly 29 are indicated only by the illustration in section of bolt holes and bolts.

Before proceeding with a detailed description of the various passage and port-defining partitions and wall portions in said member 35 it should be noted that the upper portion 38 of the pump casing is interiorly partitioned to form passages which cooperate with certain passages in the member 35 when the latter is secured over the top of the pump casing. Moreover, the bottom part of the reservoir is in fact a separate casing portion 39 which contains certain hereinafter described pressure operated valves and which has a lower substantially oblong open space which cooperates with certain openings in the upper face of the valve casing to comprehend certain hereinafter described fluid passages. It will be understood that the three heretofore referred to assembles are secured together as shown in Fig. 1 to form the complete hydraulic unit.

The pipes 33 and 34 are connected respectively to threaded members 40 and 41, the latter being secured to, and partially closing, the openings 42 and 43 at the back of casting 35. Said members 40 and 41 include spiders 44 and 45, respectively, with which similar members 46 and 47 cooperate to provide bearings in which valve rods 48 and 49 are mounted. The members 46 and 47 provide ports 50 and 51 which are closed by the valve disks 52 and 53 on rods 48 and 49 respectively. These valves 52 and 53 float in their bearings and operate in response to fluid pressure difference on the faces thereof.

Valves 52 and 53 control the fluid flow from space 54 into space 55 at the left (the cylinder bottom connection) and from space 54 into space 56 at the right (the cylinder top connection). Said space or chamber 54 is provided with branches 54a and 54b which latter passages extend vertically from top to bottom of casing 35 (see Figs. 4 and 5). Passages 57 and 58 extend through the casing 35 from spaces 55 and 56. respectively, into hemi-toroidal spaces 59 and 60, respectively. Chamber 61 is formed centrally of the casting 35 and opens out of the top thereof as best shown in Figs. 3 and 8, said chamber 61 being bounded by vertical walls 62 and 63 and a horizontal partition 64. The walls 62 and 63 are provided with circular ports 65 and 66 respectively. Ports 65 and 66 let into spaces 67 and 68 respectively, which latter in turn merge into the outlet chamber 69 of the pump casing when the assemblies are secured together as a unit (see Fig. 3). The casing 35 is also interiorly provided with a chamber 70 connected to the space 67 and the pump outlet 69, this chamber 70 being aptly described as the main outlet relief valve chamber.

Chambers 71 and 72 are situated near the left and right sides (Fig. 3) of casing 35 and extend from the top face to the bottom face of the latter to provide passages through said casing. The lower ends of said passages 71 and 72 let into pump intake passages 73 and 74 respectively, the latter being formed in the main pump assembly casing. The right hand chamber 72 also connects with a relief chamber 75. A port or opening 76 located between chambers 70 and 75 is normally closed by a spring operated relief valve 77.

The upper portions of spaces or passages 61, 71 and 72 let into a substantially oblong shallow chamber 78 formed in the bottom of the reservoir portion 39. This chamber 78 also embraces the top outlets of passages 54a and 54b thereby to provide continuous fluid passages from chamber 54 to the tops of passages 61, 71 and 72. It should be noted that the top portion of the pump casing 38 closes the lower ends of passages 54a and 54b (see Figs. 4 and 5).

The reservoir chamber 78 is bounded by a top wall casing portion 79 and valve housing 80, the wall of the latter and the outer right wall of 39 forming a fluid passage 81. A port 82 in wall 80 provides a seat for a valve disk 83 which is gravity-biased to port-closing position and can be lifted from its seat when a predetermined pressure difference exists between the fluid in chamber 78 and that in passage 81. The latter passage leads into the main fluid storage chamber 84 of the reservoir.

Ports 85 and 86 in the wall 79 are closed by ball valves 87 and 88 respectively, the latter being liftable against springs 89 and 90 to permit fluid passage through said ports 85 and 86 when the pressure differences predetermined by the selected strength of said springs 89 and 90 are exceeded. The fluid passing through port 85 enters the lower port 91 of a filter chamber 92 comprising an important interior part of the fluid reservoir while fluid passing through port 86 flows through passage 93 into the main fluid storage chamber 84.

It should be particularly noted that a very desirable structural assembly is achieved by forming the reservoir of two main parts with the fluid passage openings so disposed therebetween that a markedly complicated interior structure results when the two parts are secured together. This unique structure wherein a portion of multi-valvular structure is formed in the lower casting 39 while the necessary complemental structure is in the lower part of the casing 28 is believed novel and will be defined in one of more claims. The valves in the bottom of the reservoir are an important and novel factor in the herein described hydraulic system and therefore the particular manner of building the reservoir assembly to provide the same is of importance. The formation of the valve housings and ports in the part 39 and the closure of the upper parts of these housings by means seated in the part 28 should be particularly noted as a unique feature contributing greatly to the herein described invention. Again the provision of the chamber 78 in the reservoir assembly to cooperate as it does with the various passages through the valve casing to eventuate the fluid passages required in the operation of the here-described hydraulic system is of marked importance and will be included in one or more claims.

Inasmuch as the reservoir 28 is deemed sufficiently interiorly illustrated as a whole in the elevational cross-sectional showing of Figs. 10–16, more elaborate views (in the style of Fig. 3) are not deemed necessary and the remainder of the detailed description of said reservoir will be given in connection with said Figs. 10 to 16. The same considerations apply to the pump assembly 30.

The filter chamber 92 has a top opening 93 through which a filter-cage securing rod 94 passes, said rod 94 being secured to a filter opening cap 95. A cylindrical filter screen 96 is normally so located that the fluid entering the filter chamber 92 must pass therethrough as it exits through the opening 93, and is thus cleansed as determined by composition and other characteristics of the material of said screen 96. The filtered fluid then passes into the main reservoir. A breather opening 97 is closed by a cap 98.

The pump impellers are illustrated as co-acting pump gears 99 and 100, with inlets 73 and 74 thereto and outlet 69 therefrom corresponding to similarly designated passages in Figs. 3, 4, 5.

The valve spool 37 is moved horizontally from left to right or vice versa (Figs. 2 and 3) to control fluid passage to and from the operating cylinders 25—25 by a lever system including a hand-grippable means 101, the lower and forward end 101a of said lever system being attached to the left-hand end 37a of the valve spool. The latter includes two large port controlling cylindrical portions 102 and 103 and one small port closing portion 104. The right-hand end 37b of the control valve is associated with two springs 105 and 106, spring 105 being of light weight compared to the weight of spring 106. A barrel and collar member 107 is fixed to the reduced valve portion 37b to provide a stop 107a for the left-hand end of spring 105, said member 107 moving to the right with the control valve to compress said spring 105 between the annular stop 107a and the disk stop or spring lock 108, it being noted that an enlargement 37c at the extreme right end of the control valve 37 prevents detachment of said disk or spring lock 108.

The heavier spring 106 is compressible between the end of a cap 109 and the bottom of a cup member 110, the latter being movable to the right after the spring 105 is fully compressed. The cap 109 is exteriorly enlarged to form a shoulder 111 against which the outer or right-hand end 110a of the cup-like member 110 is adapted to abut to limit the movement of the valve in that direction. The left-hand face 110b of the cup 110 is limited in its leftward movement by the annular facial portion 112 of the casing 35. The cap 109 is secured to casing 35 to close the right-hand end of the control valve bore.

Accordingly, while only the light spring 105 is compressed as the stem 37 is moved to the right or left (and thereafter automatically serves to return the control valve to neutral position from either its raise or lower position), the heavier compressible spring 106 comes into play when the control valve stem is moved further to the right or to that position which is hereafter referred to as the "float" position of the valve. Inasmuch as the spring 106 is perceptibly heavier than the spring 105, the operator can feel the difference as he comes to the end of the lowering movement and wishes to move the valve into float position, i. e. when the perceptibly heavier spring 106 must be compressed as the right-hand end of the control valve stem 37 is moved to its ultimate rightward limit. The heavier spring 106 is compressed as it is so moved to float position between the bottom of the cup 110 and the inner face of the cap 109. The member 110 is moved to the right after the spring 105 has been fully compressed whereupon the disk or spring lock 108 positively forces said member 110 to the right. The compression of said spring 106 continues until the lip 110a abuts against the inner annular stop portion 111 of the cap 109.

When the operator releases the handle 101 (the valve being in float position), the control valve is automatically returned to neutral position by the conjoint expansive action of the springs 106 and 105.

Before proceeding to describe the operation of the load connected to the hydraulic system, it should be noted that the valve spool is in "hold" or "neutral" position in Figs. 2 to 9, inclusive, that is, the fluid supplied under pumping pressure at 69 is prevented from entering either 59 or 60, thereby to be directed through passages 57 or 58 into either of the cylinder chambers 55 or 56. In other words, when in neutral position the ports between 59 and 67 and between 60 and 68 are both closed by the valve portions 102 and 103. Accordingly, the fluid pumped out of 69 will flow through passages 67 and 68, ports 65 and 66, passage 61, chamber 78, passages 71 and 72, and into the inlet passages 73 and 74 of the pump. This is the position to which the valve 37 is moved when, after either a pressure raising or a pressure lowering of the jack pistons has been effected, it is desired that the blade and tractor will remain in the same relative positions as those into which they have been moved, i. e. it is that position to which the valve is moved after the fluid has been supplied under pressure either to raise or to lower the pistons a desired amount; in a word, it is the "hold" position or valve position at which the pistons are maintained in any desired position. When the valve is in neutral position the pump is operating under idling (no load) conditions since it is not then required to build up fluid pressure in either direction.

The hereinbefore described ball valve 88 has less area exposed to opening pressure than the same size ball valve 87 (by reason of the port 86 being of smaller diameter than the port 85). Accordingly, although the valve springs 89 and 90 exert the same force on the balls 87 and 88, greater fluid pressure must be exerted to open valve 88 than is required to open valve 87. While said valve 88 may not in all cases be required, it has been found to be of considerable value under some of the conditions encountered in systems as herein described. Sometimes the passage from the filter chamber 92 or the filter itself may become clogged whereupon the back pressure in the chamber 92—91 is sufficient to prevent the opening of valve 87. Under such conditions it is desirable that the fluid which is to be withdrawn from the system under the conditions hereinbefore specified may be passed directly into the main chamber 84 of the reservoir. Accordingly, when the pressure becomes high enough, the valve 88 opens against the spring 90 and passage of the excess fluid directly into the fluid reservoir occurs.

Finally, it should be pointed out that the spring 77 of the main relief valve is of very appreciable strength so that pressures in the neighborhood of 1000 pounds per square inch must be reached in the pump outlet 69 and 70 before the port 76 is opened to permit the fluid to be by-passed directly to the pump intakes.

While it is clear that the passages 67, 68, 71 and 72 in the bottom of valve casing 35 match directly and cooperate with the inlet and outlet chambers in the pump casing 38 to comprehend intake and exit passages for the operating fluid, the manner in which the passages are formed at the top of the casing 35 by the interrelation of the top openings therein and the chamber 78 in the lower portion of the reservoir assembly may not be so clear. Accordingly the portion of said chamber 78 in contact with the upper valve casing openings has been shown in dotted lines in Fig. 8.

Figure 10:
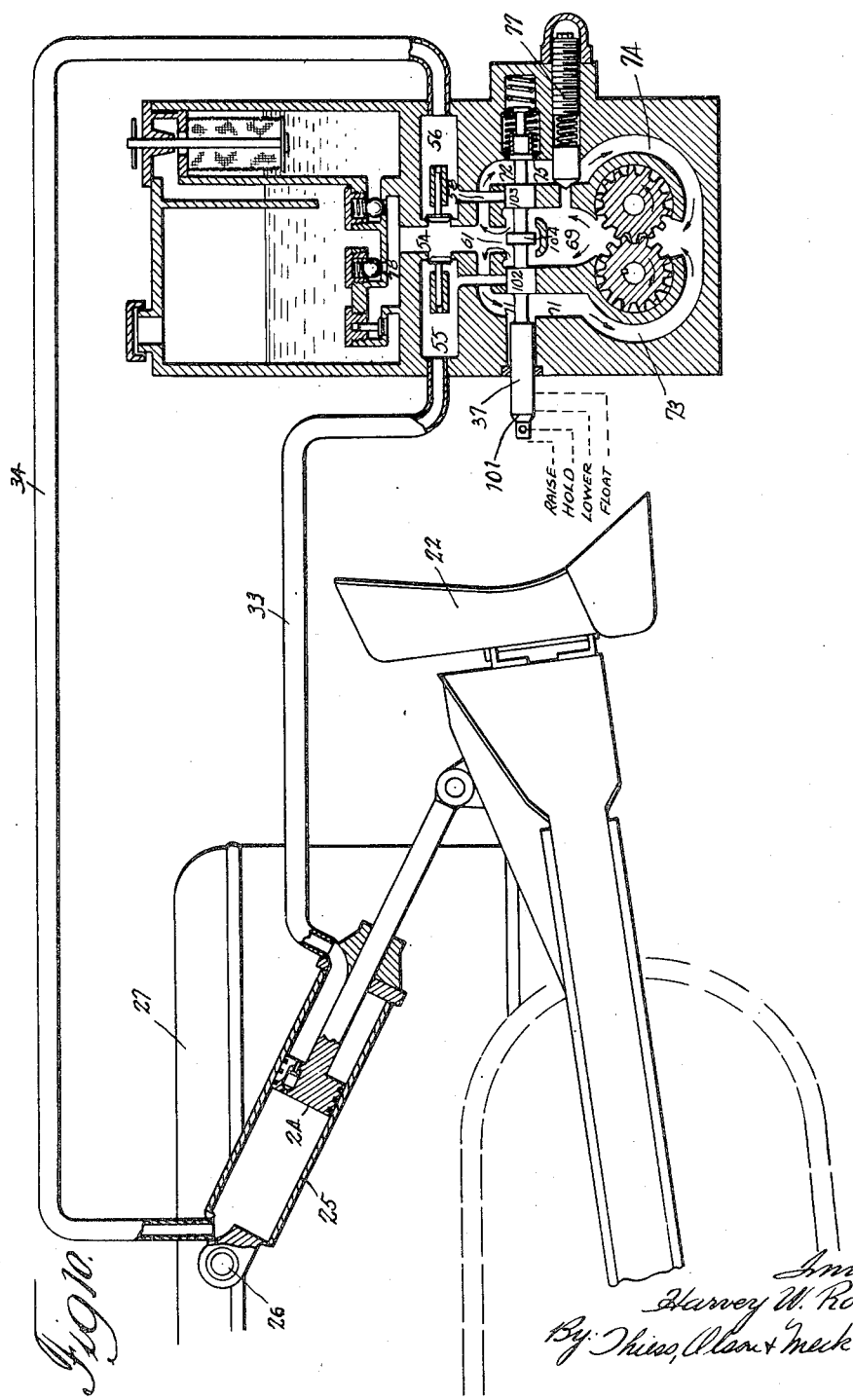

In Fig. 10 the position of all of the elements of the hydraulic system used in connection with the bulldozer are shown with the directional control valve 37 in "hold" or neutral position. The piston 24 is held in the position shown with the bulldozer blade 22 lifted off of the ground due to the fact that the fluid on the piston rod side of the jack piston is restrained from returning to the reservoir or pump through the pipe 33. When the valve is in the position shown, any fluid which is pumped into space 69 will, as just immediately above described, flow through the various passages back to the pump intake passages 73 and 74.

It will be noted that some liberty has been taken with the various fluid passages in order to show the complete fluid flow through the valve and the various fluid passages, all of the flow being shown as though occurring in the plane of the paper although this of course is not the fact as will have been understood from the discussion of the various mechanisms hereinbefore described.

The remaining fluid in lines 33 and 34 and in the end of the jack opposite the piston rod is of course unaffected because here again no fluid can return from the upper end of the cylinders through pipe 34 because the valve portion 103 blocks the return passage through 58 into 60 in the same manner that valve portion 102 is blocking further supply of fluid through 57, 55 and pipe 33. Furthermore, the pressure in space 54 is not sufficient to raise ball valve 87 to permit fluid flow through port 85 into the filter chamber 92 of the reservoir.

Figure 11:
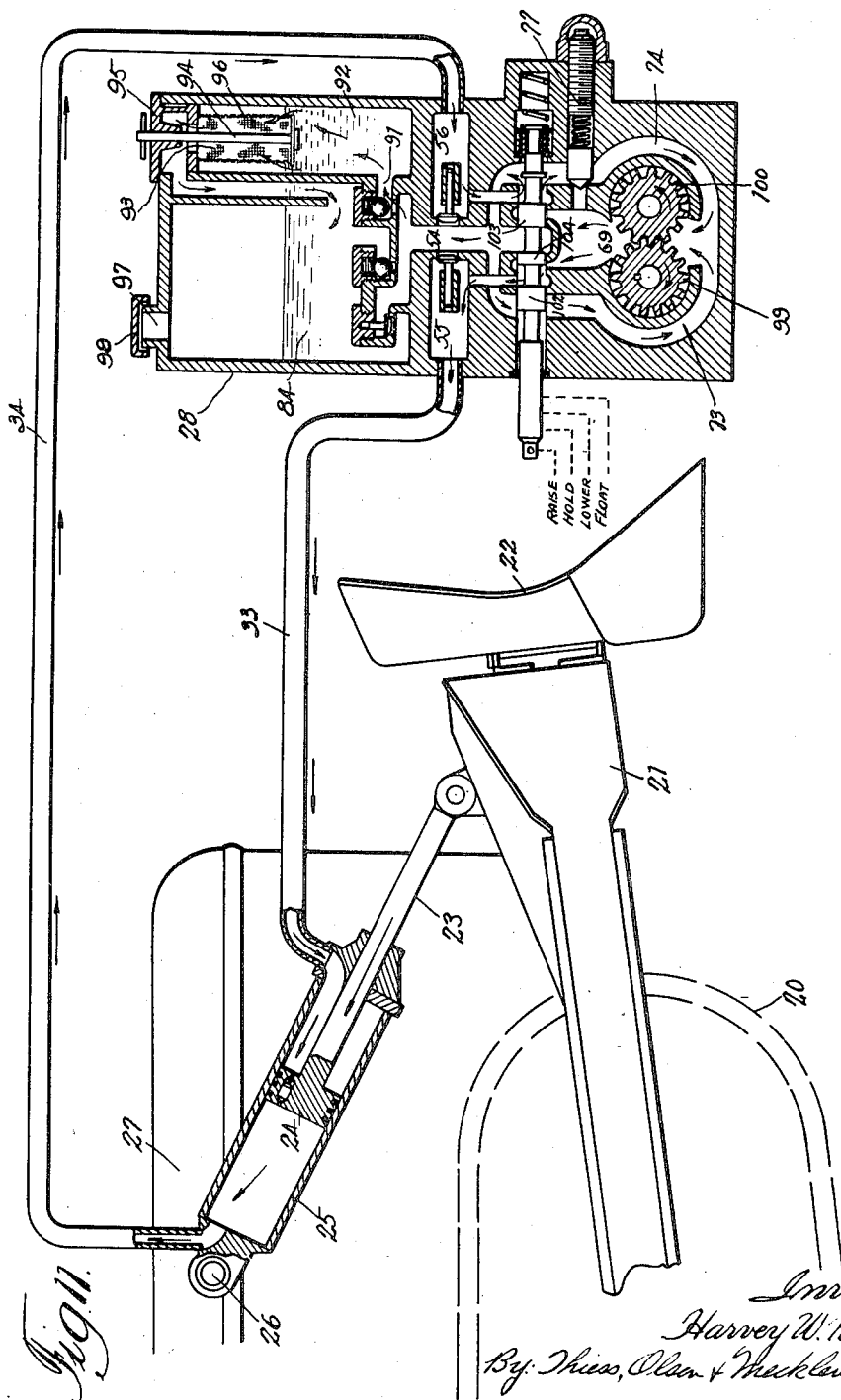

Referring now to Fig. 11, it will be noted that the lever system 101 and 101a has been operated to move the valve spool to the left into the position designated as "raise" position. When the valve has been so moved, the portions 102 and 103 no longer block the passages 57 and 58. The pump is now operated under load conditions and pumps pressure fluid from 69 through 67 and, port 65 being blocked by valve member 104, forces fluid through the port which is uncovered between passage 67 and the hemi-toroidal space 59. From the latter the fluid flows through passage 57 into chamber 55, whence it is forced outwardly into pipe 33 and into the bottom of the cylinder under the piston 24. The piston 24 is thus forced upwardly and the blade 22 is thus positively raised as long as the fluid continues to be forced under pressure through the just defined passages. As the piston moves upwardly in the cylinder, the fluid in the top of the cylinder is forced therefrom through pipe 34. The fluid passing out through pipe 34 is under appreciable pressure which will hereinafter be referred to as the back pressure of the fluid. This fluid passes from pipe 34 into space 56 and thence into the passage 58, the hemi-toroidal space 60, and space 72, and thence into the intakes 73 and 74 (a portion of the fluid finding its way via chamber 78 and passage 71 into intake 73 to the intake side of the pump impellers).

However, more fluid is forced out of the upper end of the cylinders than can be forced into the lower end of the same cylinder, this because of the volumetric difference arising from the presence of the piston rod on the lower side of the piston and not on the upper side thereof. Accordingly the excess fluid forced out of the top of the cylinder must be given room. The present hydraulic system is unique in the expeditious manner in which this is accomplished and also in the fact that the back pressure is such that the fluid is forcibly fed to the pump, thereby completely filling the toothed pockets in the pump gears. This latter feature is in distinct contrast to the ordinary design wherein the pump is required to draw the fluid or obtain it by suction from the reservoir.

Reverting to the first of the advantages just referred to, the excess fluid is absorbed into the reservoir through the port 85 by reason of the ball valve 87 being raised from its seat by back pressure of the fluid which is forced out of the top of the cylinder and which (as diagrammatically illustrated in Fig. 11) is, so far as the excess which cannot be taken care of by the pump intake is concerned, forced upwardly to move said ball valve 87 from its seat. Thereupon the excess fluid passes into the filter chamber 92 and through the same into the main reservoir chamber 84.

Accordingly, the valve 87 may be conveniently referred to as the back pressure valve.

With respect to the hydraulic system providing the second of the aforementioned advantages, this is deemed to be of such importance as to warrant claiming the same as a unique feature of such systems. The positive supply of fluid under pressure to the pump intake contributes markedly to the efficiency of operation since no void or suction is ever apparent on the intake side of the pump. However, this definite supercharging effect at the inlet to the pump cannot be secured unless the other combinative features of this system are arranged in the manner hereinbefore described.

At this point it is proper to illustrate a feature of marked advantage in systems the equivalent of or involving the same problems as those herein described. When the operator continues to hold the valve in "raise" position the piston 24 ultimately approaches the top of the cylinder. Under these conditions the pressure at the pump outlet rises to overload proportions and the main relief valve 77 would ultimately be forced open thereby to relieve the system of such excessive pressure. Such, however, would involve a continuous overload condition on the pump with a marked loss in efficiency of operation since the pump would be kept working at high pressure without any mechanical advantage being realized. The present system overcomes any such tendency and insures that after the piston has been brought to the top of the cylinder, i. e., after the bulldozer blade has been moved to its highest predetermined elevatable position, the pressure fluid in the bottom of the cylinder will be bled from the cylinder bottom.

Figure 12:
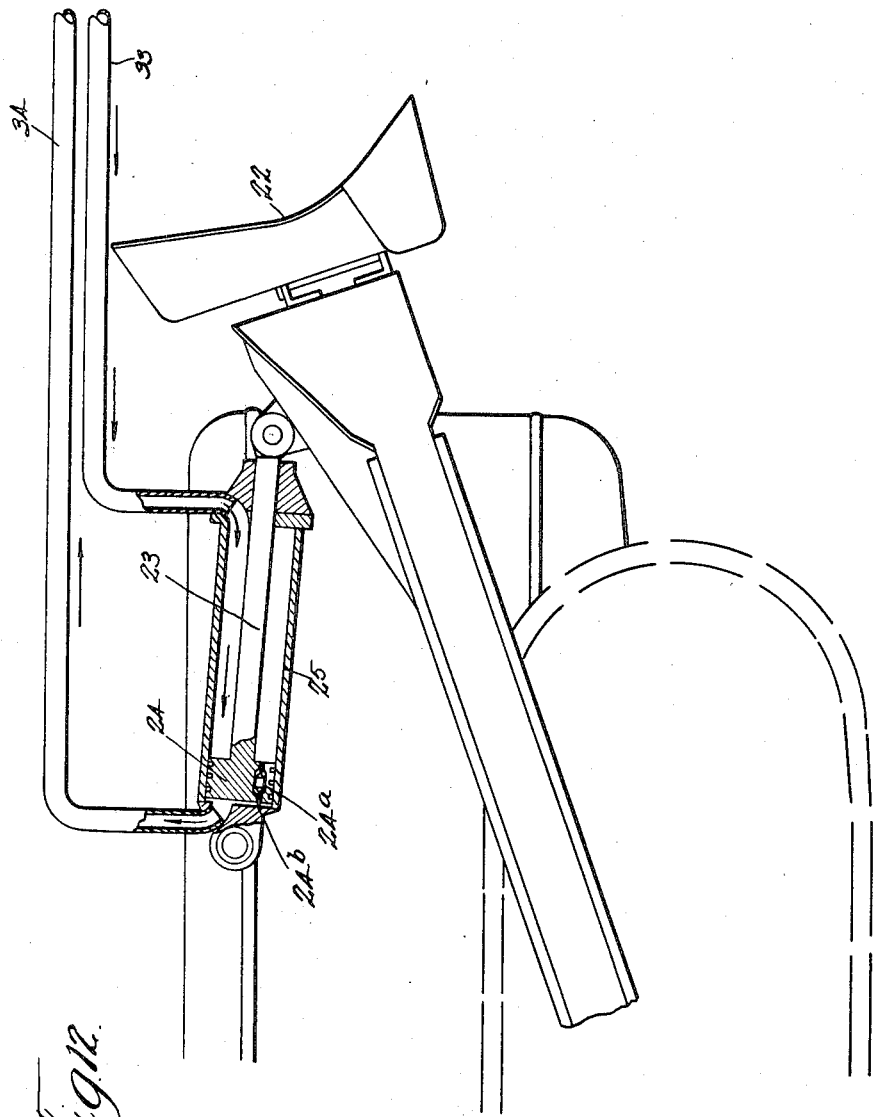

In Fig. 12 a poppet valve 24a is provided in the piston so that as the latter approaches a predeterminable distance from the top of the cylinder an operating feeler 24b on the poppet valve strikes the top of the cylinder thereby to open the valve and allow the pressure fluid to escape through a restricted opening which latter is just sufficient to maintain the pressure desired to hold the blade in the extreme raised position. The valve can be made double-acting in principle so that it will be opened if pressure fluid continues to be supplied to the upper end of the cylinder in the extreme lowered position.

Before leaving the description of the conditions present as the blade is being raised under pressure, attention is again directed to the spring 105 at the right-hand end of the valve spool 37. In Fig. 11 it will be noted that this spring has been compressed as the spool is moved to the left by reason of the collar 107 being limited in movement as it comes against the wall forming the port between 60 and 72 and at its other end by the washer 108 following the enlarged end portion of the spool. Accordingly should the operator release the valve lever, the spool will automatically return to "neutral" position from the "raise" position, thereby to hold the blade in the position to which the operator has moved it but insuring that the pressure "raise" condition will not continue unless the operator positively so intends, i. e. that the valve cannot inadvertently be so left that the pump will continue to supply pressure fluid. Assume now, however, that the operator wishes to permit the blade to lower itself due to its weight but as yet not to apply pressure fluid to the top of the cylinders positively to move the blade downward.

It will be recalled that the fluid contained in the piston rod side of the jack and in the line leading from the cylinder to the chamber 55 is under high pressure. When therefore the operator moves the valve spool to the right (see Fig. 13), a passage is opened through which the high pressure fluid can escape, which latter it does at a considerable velocity due to the fact that the weight of the bulldozer blade is considerable and tends to move rapidly downward. This high velocity movement of the fluid out of the jack is commonly referred to as a surge. In the hydraulic systems now utilized the disposition of this surging fluid raises many difficulties which are avoided in the present system. In the latter there are three possible avenues of escape for the fluid.

Some of the fluid may be taken care of at the inlet to the pump. The latter, however, may be either not in motion or is operating at idling speed and in either of these cases in proportions dictated by the varying circumstances only a small part of the high velocity surge fluid can be absorbed.

Inasmuch as the rapid downward movement of the piston tends to establish a void in the top of the cylinder, a very desirable path for the high velocity surge fluid is the return path via pipe 34 to the top of the cylinder. In most of the usual systems, however, this path is approachable only through the pump mechanism wherefrom the fluid is once again largely non-absorbable. In the present day systems most of such fluid is returned to a fluid reservoir with all of the undesirable concomitants of such return which have been heretofore described.

In the present system the passage to the reservoir is blocked by the back pressure valve 87 which requires an opening or lifting pressure (so given for illustrative purposes only) of approximately 20 pounds per square inch. The latter therefore represents an impediment to the surge fluid which will not be overcome if some other easily traversable path is provided.

The present system does provide such a path, i. e., the passage directly from the chamber 55 to the chamber 56 when the valve 53 is moved to the right to open the port 51. Inasmuch as the fluid in the pipe 34 and the top of cylinder 25 exerts less than atmospheric pressure, the valve 53 is easily opened by the impingement on the left-hand face thereof of the high pressure surge fluid. Accordingly the major portion of the high velocity surge fluid which is forced back through pipe 33, when the valve is moved to permit the bulldozer blade to pull the piston rod and piston downwardly, passes directly into chamber 54 via passage 57, hemi-toroidal space 59, the port between the latter and space 71, chamber 78 and 54a—54b.

The high pressure fluid thus led into chamber 54 is at a higher pressure than any fluid in pipe 34 and chamber 56. Accordingly the floating check valve 53 is moved to right to open the port 51 and permit the necessary fluid to flow into the top of cylinder 25. The check valve 53 is maintained open until sufficient fluid has passed into the cylinder top and the surge conditions have been so relieved that the pressure differential on the two sides of said valve 53 is insufficient to maintain it in open condition Inasmuch as some of the surge fluid can be accepted by the pump, the latter is shown as taking in and pumping out some of the fluid through 68, 60, 58 and 56.

Thus the present system provides an automatically openable diversionary path for the major portion of the surge fluid and thereby prevents the necessitous violent entrance thereof into a reservoir. Not only must such a reservoir in present systems be made abnormally large to take care of such excess fluid but it also follows that the entrance of such high velocity fluid thereinto also sets up the hereinbefore described undesirable foaming and spill-over conditions.

Assume that the bulldozer blade ultimately contacts the ground and it is desired to force the blade further downwardly under pressure. First, however, it must be appreciated that just before reaching this point there is momentary pause or lag in the downward travel of the blade. This is caused by a partial void in the cylinder top due to the fact that more fluid is required to fill the top of the cylinder than is withdrawn from the bottom thereof. This is because of the volumetric difference between the cylinder space on the rod side of the piston as compared with the other side thereof. At the instant the downward movement of the blade stops, the flow of fluid from the jack will stop and the back pressure will immediately be relieved. When these circumstances arise, sufficient excess fluid to take care of the volumetric difference will enter the system through the check valve 83. Such entry of fluid into the system from the reservoir will continue during the downward stroke of the piston.

After the valve 53 returns to its normal closed position, load operation of the pump supplies pressure fluid through the path shown in Fig. 14 to the top of the cylinder to force the piston to its extreme lower position, i. e., fluid is taken in through pump inlets 73 and 74, and forced out as hereinbefore described through the path indicated by 68, 60, 58, 56 and 34 (Fig. 14).

After the full downward stroke of the pistons is completed and the forward portion of the tractor is raised off the ground by continued downward movement of the blade (see Fig. 15) and it is desired thereafter to raise the blade relative to the tractor, the latter movement is accomplished most efficiently through utilization of the weight of the tractor. That is, after the control valve has been moved to "raise" position, the fluid is expelled under pressure from the tops of the cylinders. This expelled fluid flows through the pipe 34 in the direction of the arrow in Fig. 15 at a high velocity. Accordingly, a surging condition is again imminent with the fluid entering the hydraulic system through the pipe 34. However, because of the hereinbefore explained volumetric difference between the piston rod end and the other end of the cylinders, more fluid will be returned from the tops of the cylinders than can be accommodated in the cylinders on the piston rod side of the piston, the excess being equal to the volume displaced by the volume of the piston rod in the lower part of the cylinders. Once again a void in effect will exist in the cylinders, but this time at the lower end or under the pistons. There will accordingly be enough difference in pressure on the two sides of valve 52 to cause the latter to move to the left to open the port 50 (Fig. 15). However, even this direct path will not relieve the system of the just referred to excess fluid. While some of the fluid may also go to the inlet of the pump, an appreciable portion thereof must be withdrawn into the reservoir. Accordingly since the return fluid is under a pressure of approximately 20 pounds per square inch, the valve 87 will open to permit fluid flow through the port 85 and into the reservoir via the filter chamber 92. When the weight of the front end of the tractor is supported by the ground, i. e. when both the front end of the tractor and the blade are in contact with the ground, the fluid must again be supplied to the bottoms of the cylinders under pressure as shown in Fig. 11. Thus the cycle of operation is completed.

As hereinbefore intimated in connection with the description of the manner in which the springs 105 and 106 operate, the herein described valve mechanism is also capable of being so positioned that the bulldozer blade may float, that is, that fluid may be interchanged between the upper and lower portions of the cylinders without disturbing any of the automatic valve controls which have hereinbefore been described. In Fig. 16 the control valve 37 is shown in an extreme right-hand position, the various ports being opened in the manner illustrated in this diagrammatic showing. When the valve is in the Fig. 16 position, the piston rises or falls and the bulldozer blade floats, i. e., the blade rises or falls as determined by the ground level over which the blade passes when the valve is in the indicated position. The fluid can then pass from the lower part of the cylinder through pipe 33, space 55, passage 57, passage 71, passage 72, passage 58, chamber 56, pipe 34 and into the upper end of the cylinder or vice versa, that is, when the valve is in the position shown, the fluid may pass freely in either direction between the two ends of the cylinder. This float operation is accomplished with a minimum structural complication, in fact, with no additional passages in the valve assembly, all because the unique structure of the control valve and the passages to the controls are sufficiently flexible to permit of the float operation without the added complication that has many times in the past been necessary in order to afford this very disirable desideratum in connection with valve operation in such systems.

During the foregoing description the various advantages of the herein illustrated hydraulic system have been emphasized in connection with the descriptions of the various parts of the system. They may, however, be summarized as a proper prelude to the claims in which the operation and structure of the invention are delineated.

The efficiency of the system is improved greatly because of the hereinbefore explained force feed to the inlet side of the pump. Furthermore the system because of its unique utilization of the various fluid passages offers markedly less restriction to fluid flow through the system which likewise results in the improved efficiency of operation of this system.

The compactness of the hydraulic unit has already been emphasized but it may be pointed out that in addition to obtaining compactness because of the unique features of the here described unit, the latter is easily adaptable to either the front or rear of various tractor models which are many times utilized to support bulldozer mold boards and the apparatus for raising and lowering the same.

Finally, the method of operating the system in itself contributes to improved performance. The definite control of the surge fluid which has been described during the illustration of the operation of the system by diverting the incipient surge developing fluid around the reservoir as well as around the pump (so far as the latter cannot handle the same) is in itself an outstanding accomplishment. The elimination of the necessity for introducing this surge fluid into the reservoir decreases the tendency of the fluid to foam and this decrease in turn insures the other numerous hereinbefore described advantages.

From a structural viewpoint, the interior of all of the units represents many novel features, not the least of which is the formation of the various passages and chambers and the ports therebetween in such a manner that the various port passages and tank interior can be easily cleaned despite the fact that a relatively complicated system of passages must be provided in order to take care of the operating system as herein described.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a fluid operated system, load raising and lowering means comprising an hydraulic cylinder and piston, means for supplying fluid under pressure to said cylinder, a valve controlling the direction of fluid supply and operable to hold position in which the flow of fluid between said pressure supply means and said cylinder is prevented, means normally retained in closed position but adapted automatically to open under predetermined operating conditions to by-pass the fluid around the pressure supply means and permit it to flow directly from one side to the other of the piston in said cylinder, and a fluid reservoir having check valve means communicating said reservoir with said pressure supply means on the cylinder side of said control valve, said by-pass means and said check valve means providing pressure controlled direct connection between said reservoir and each side of said piston with said control valve in hold position.

2. In a fluid operated system, load raising and lowering means comprising an hydraulic cylinder and piston, means for supplying fluid under pressure to said cylinder, a valve controlling the direction of fluid supply and operable to hold position in which the flow of fluid between said pressure supply means and said cylinder is prevented, means normally retained in closed position but adapted to be opened when the load attached to said piston is raised or lowered under abnormal operating conditions to expel the fluid from one end of said cylinder at a greater speed than said fluid can be returned to the other end of said cylinder through the normal fluid supply means, and a fluid reservoir having check valve means communicating said reservoir with said pressure supply means on the cylinder side of said control valve, said normally closed means and said check valve means providing pressure controlled direct connections between said reservoir and each end of said cylinder with said control valve in said hold position.

3. In a fluid operated system, load raising and lowering means comprising an hydraulic cylinder and piston, means for supplying fluid under pressure to said cylinder, a control valve for controlling the direction of fluid supplied from said pressure supply means to said cylinder and operable to hold position in which the flow of fluid between said pressure supply means and said cylinder is prevented, means for diverting the fluid expelled from one end of said cylinder, under abnormal conditions of rise and fall of the load attached to the piston thereof, around the pressure supply means to the other end of said cylinder at a rate greater than that at which the fluid can be passed through said fluid supply means, and a fluid reservoir having check valve means communicating said reservoir with said pressure supply means on the cylinder side of said control valve, said diverting means and said check valve means providing pressure controlled direct connection between said reservoir and each end of said cylinder with said control valve in said hold position.

4. In a fluid operated system, load raising and lowering means comprising an hydraulic cylinder and piston, means for supplying fluid under pressure to said cylinder, a control valve for controlling the direction of fluid supplied from said pressure supply means to said cylinder, said control valve having a hold position in which the flow of fluid between said pressure supply means and said cylinder is prevented, means for diverting the fluid expelled from one end of said cylinder, under abnormal conditions of rise and fall of the load attached to the piston thereof, around the pressure supply means to the other end of said cylinder at a rate greater than that at which the fluid can be passed through said fluid supply means, said last defined means including by-pass valves between the pressure supply means intake and each end of said cylinder, and a fluid reservoir having check valve means communicating said reservoir with said pressure supply means on the cylinder side of said control valve, said by-pass valves and said check valve means providing pressure controlled direct connections between said reservoir and each end of said cylinder even though said control valve occupies said hold position.

5. In a fluid operated system, load raising and lowering means comprising an hydraulic cylinder and piston, means for supplying fluid under pressure to said cylinder, a control valve for controlling the direction of fluid supplied from said pressure supply means to said cylinder, said control valve having a hold position in which the flow of fluid between said pressure supply means and said cylinder is prevented, means for diverting the fluid expelled from one end of said cylinder, under abnormal conditions of rise and fall of the load attached to the piston thereof, around the pressure supply means to the other end of said cylinder at a rate greater than that at which the fluid can be passed through said fluid supply means, said last defined means including by-pass valves between the pressure supply means intake and each end of said cylinder, said valves being normally held closed by the pressure conditions existent when the fluid supply means operates to supply fluid to one or the other ends of said cylinder positively to raise or lower said load, and a fluid reservoir having check valve means for communicating said reservoir with said pressure supply means on the cylinder side of said control valve, said by-pass valves and said check valve means providing pressure controlled direct connection to supply make-up fluid from said reservoir to either end of said cylinder even though said control valve occupies said hold position.

6. In a fluid operated system, load raising and lowering means comprising an hydraulic cylinder and piston, means for supplying fluid under pressure to said cylinder, a control valve for controlling the direction of fluid supplied from said pressure supply means to said cylinder, means for diverting the fluid expelled from one end of said cylinder, under abnormal conditions of rise and fall of the load attached to the piston thereof, around the pressure supply means to the other end of said cylinder at a rate greater than that at which the fluid can be passed through said fluid supply means, said last defined means including passages around the fluid supply means and through said control valve to directly connect the opposite ends of said cylinder when said control valve is positioned to supply fluid to said cylinder, by-pass valves in said passages on the cylinder side of said control valve adapted to be operated by the pressure differential between the fluid in the opposite cylinder ends, and a fluid reservoir having check valve means for communicating said reservoir with a portion of said passages on the cylinder side of said control valve, said check valve means and said by-pass valves providing pressure controlled direct connections to supply make-up fluid from said reservoir to said cylinder ends even though said control valve is in position to block the supply of fluid to said cylinder from said fluid supply means.

7. In a fluid operated system, load raising and lowering means comprising hydraulic cylinders and pistons, means for supplying fluid under pressure to said cylinders, a control valve for controlling the direction of fluid supplied from said pressure supply means to said cylinders, and means for diverting the fluid expelled from one end of said cylinders, under abnormal conditions of rise and fall of the load attached to the pistons thereof, around the pressure supply means to the other end of said cylinder at a rate greater than that at which the fluid can be passed through said fluid supply means, said last defined means including by-pass valves between the pressure supply means intake and each end of said cylinders, said valves being normally held closed by the pressure conditions existent when the fluid supply means operates to supply fluid to one or the other ends of said cylinders positively to raise or lower said load, said control valve and said by-pass valves being disposed in the same horizontal plane with the control valve situated substantially centrally of the valve assembly and the by-pass valves being situated laterally of said control valve, the control valve comprising a spool movable horizontally in a valve casing and the by-pass passage opening valves comprising float valves seated wholly within the casing, said latter valves being supported at one end by structural means located within the valve casing and at the other ends by coupling means provided with valve rod supports, said coupling means performing the dual function of closing the ends of open portions within said valve casing and providing connections to said hydraulic cylinders.

8. In a fluid operated system, load raising and lowering means comprising an hydraulic cylinder and piston, means for supplying fluid under pressure, a control valve for selectively connecting the opposite ends of said cylinder to the intake and outlet side of said fluid supply means and for disconnecting said fluid supply means from said cylinder, power passageways connecting the respective ends of said cylinder to said control valve, a by-pass passageway communicating with said power passageways on the cylinder side of said control valve by pressure responsive by-pass valves and with the intake side of said fluid supply means at said control valve, said by-pass valves adapted normally to be held closed by the pressure conditions existent when the fluid supply means operates to supply fluid to one or the other ends of said cylinder positively to raise or lower the load, said by-pass valves selectively opening under abnormal conditions of rise and fall of the load to connect directly to the intake side of said fluid supply means, the end of said cylinder connected to the outlet side through said control valve to by-pass fluid directly from one end of the cylinder to the other through said control valve at a rate greater than that at which fluid can be passed through said fluid supply means, a fluid reservoir, and check valve means for communicating said reservoir with the intake of said fluid supply means, said check valve means and said by-pass valves selectively communicating said reservoir directly with the ends of said cylinder when abnormal pressure conditions exist therein with said control valve positioned to disconnect said cylinder from said fluid supply means.

9. In a fluid pressure system having a hydraulic cylinder and piston, a fluid reservoir and a pump, a control valve, pressure and relief passages for supplying fluid from the outlet side of said pump to said valve and returning fluid from said valve to the intake side of said pump, motor passages connecting said valve to opposite ends of said cylinder, said valve having a valve member movable to operating positions for selectively connecting the opposite ends of said cylinder to the intake and outlet sides of said pump and to hold position in which the flow of fluid between said pump and said cylinder is prevented, a by-pass passageway communicating by valve means with said reservoir and with at least one of said motor passageways on the cylinder side of said control valve member, said valve means normally being retained in closed position and being operable to open position responsive to predetermined pressure differences on opposite sides thereof to permit the flow of fluid from said reservoir to the relatively low pressure side of said system although said control valve is in hold position.

10. In a fluid pressure system having a hydraulic cylinder and piston, a fluid reservoir and a pump, a control valve, pressure and relief passages for supplying fluid from the outlet side of said pump to said valve and returning fluid from said valve to the intake side of said pump, motor passages connecting said valve to opposite ends of said cylinder, said valve having a valve member movable to operating positions for selectively connecting the opposite ends of said cylinder to the intake and outlet sides of said pump and to hold position in which the flow of fluid between said pump and said cylinder is prevented, a by-pass passageway communicating with said motor passageways on the cylinder side of said valve member by pressure responsive valves, and check valve means connecting said reservoir to said by-pass passageway, said pressure responsive and check valves normally being retained in closed position and being operable to open position responsive to pressure differences on opposite sides thereof to permit the flow of fluid from said reservoir to the relatively low pressure side of said system although said control valve is in hold position.

11. In a fluid pressure system having a hydraulic cylinder and piston, a fluid reservoir and a pump, a control valve, pressure and relief passages for supplying fluid from the outlet side of said pump to said valve and returning fluid from said valve to the intake side of said pump, motor passages connecting said valve to opposite ends of said cylinder, said valve having a valve member movable to operating positions for selectively connecting the opposite ends of said cylinder to the intake and outlet sides of said pump and to hold position in which the flow of fluid between said pump and said cylinder is prevented, a by-pass passageway communicating with said motor passageways on the cylinder side of said valve member by valve means, said reservoir communicating with said by-pass passageway by valve means, and said by-pass passageway being in communication with the motor passageway connected to the intake side of said pump when said control valve is in operative position, said valve means normally being retained in closed position and being operable to open position under predetermined conditions.

12. Fluid pressure supply apparatus for operating a hydraulic motor having a pair of fluid ports, said apparatus comprising means for supplying fluid under pressure to said motor, a valve controlling the direction of fluid supply and operable to hold position in which the flow of fluid between said pressure supply means and said hydraulic motor is prevented, means normally retained in closed position but adapted automatically to open under predetermined operating conditions to by-pass the fluid around the pressure supply means and permit it to flow directly from one fluid port of said hydraulic motor to the other, and a fluid reservoir having valve means communicating said reservoir with said by-pass means on the motor side of said control valve, said by-pass means and said valve means providing pressure controlled direct connection between said reservoir and each fluid port of said motor with the control valve in hold position.

13. Fluid pressure supply apparatus for operating a hydraulic motor having a pair of fluid ports, said apparatus comprising means for supplying fluid under pressure to said motor, a control valve for controlling the direction of fluid supplied from said pressure supply means to said motor and operable to hold position in which the flow of fluid between said pressure supply means and said motor is prevented, means for diverting the fluid expelled from one of said fluid ports, under certain conditions of motor load, around the pressure supply means to the other fluid port at a rate greater than that at which the fluid can be passed through said fluid supply means, and a fluid reservoir having valve means communicating said reservoir with said diverting means on the motor side of said control valve, said diverting means and said valve means providing pressure controlled direct connection between said reservoir and each of said fluid ports with said control valve in said hold position.

14. Fluid pressure supply apparatus for operating a hydraulic motor having a pair of fluid ports, said apparatus comprising means for supplying fluid under pressure to said motor including an intake, a control valve for controlling the direction of fluid supplied from said pressure supply means to said motor, said control valve having a hold position in which the flow of fluid between said pressure supply means and said motor is prevented, means for diverting the fluid expelled from one fluid port of said motor, under abnormal conditions of load, around the pressure supply means to the other fluid port at a rate greater than that at which the fluid can be passed through said fluid supply means, said diverting means including by-pass valves between the pressure supply means intake and each of said fluid ports, said valves being normally held closed by the pressure conditions existent when the fluid supply means operates to supply fluid to one or the other of the fluid ports of said motor, and a fluid reservoir having check valve means for communicating said reservoir with said diverting means on the motor side of said control valve, said by-pass valves and said check valve means providing pressure controlled direct connection to supply fluid from said reservoir to either fluid port of said motor even though said control valve occupies said hold position.

15. Fluid pressure supply apparatus for operating a hydraulic motor having a pair of fluid ports, said apparatus comprising means for supplying fluid under pressure to said motor, a control valve for controlling the direction of fluid supplied from said pressure supply means to said motor, means for diverting the fluid expelled from one fluid port of said motor, under abnormal conditions of load, around the pressure supply means to the other fluid port at a rate greater than that at which the fluid can be passed through said fluid supply means, said diverting means including passages around the fluid supply means and through said control valve to directly connect the said motor fluid ports when said control valve is positioned to supply fluid to said cylinder, by-pass valves in said passages on the motor side of said control valve adapted to be operated by the pressure differential between the fluid at said fluid ports, and a fluid reservoir having check valve means for communicating said reservoir with a portion of said passages on the motor side of said control valve, said check valve means and said by-pass valves providing pressure controlled direct connections to supply make-up fluid from said reservoir to said motor fluid ports even though said control valve is in position to block the supply of fluid to said motor from said fluid supply means.

16. Fluid pressure supply apparatus for a hydraulic system including a hydraulic motor having a pair of fluid ports, comprising a fluid reservoir, a pump, a control valve, pressure and relief passages for supplying fluid from the outlet side of said pump to said valve and returning fluid from said valve to the intake side of said pump, motor passages for being connected to the fluid ports of said motor, said control valve having a valve member movable to operating positions for selectively connecting the fluid ports of said motor to the intake and outlet sides of said pump and to hold position in which the flow of fluid between said pump and said motor is prevented, a by-pass passageway communicating by valve means with said reservoir and with at least one of said motor passageways on the motor side of said control valve member, said valve means normally being retained in closed position and being operable to open position responsive to predetermined pressure differences on opposite sides thereof to permit the flow of fluid from said reservoir to the relatively low pressure side of said system although said control valve is in hold position.

17. Fluid pressure supply apparatus for a hydraulic system including a hydraulic motor having a pair of fluid ports, comprising a fluid reservoir, a pump, a control valve, pressure and relief passages for supplying fluid from the outlet side of said pump to said valve and returning fluid from said valve to the intake side of said pump, motor passages for being connected to the fluid ports of said motor, said control valve having a valve member movable to operating positions for selectively connecting the fluid ports of said motor to the intake and outlet sides of said pump and to hold position in which the flow of fluid between said pump and said motor is prevented, a by-pass passageway communicating with said motor passageways on the motor side of said valve member by pressure responsive valves, and check valve means connecting said reservoir to said by-pass passageway, said pressure responsive and check valves normally being retained in closed position and being operable to open position responsive to pressure differences on opposite sides thereof to permit the flow of fluid from said reservoir to the relatively low pressure side of said system, although said control valve is in hold position.

18. A compact hydraulic unit for operating a hydraulic motor having a pair of fluid ports, said unit comprising a pump, a reservoir and a control valve arranged between said pump and reservoir, said valve comprising a casing having a longitudinal bore with a valve member movable therein, a central passageway and side passageways extending transversely through said casing and communicating with said bore, said central passageway being connected to the outlet side of said pump and said side passageways communicating with the intake side of said pump, motor passageways for being connected to said hydraulic motor fluid ports and communicating with said bore, said valve member having recesses which may be positioned to connect said central passageway with either one of said motor passageways and the other motor passageway with one of said side passageways, an end passageway connecting said central and said side transverse passageways, valve means connecting the reservoir to said end passageway, and valve means communicating said end passageway with said motor passageways on the motor side of said control valve member, said valve means being retained in closed position but adapted automatically to open under predetermined conditions.

19. Fluid pressure control apparatus for a hydraulic system including a double acting hydraulic motor having a pair of fluid ports and a pump, said apparatus comprising a control valve, pressure and relief passages for supplying fluid from the outlet side of the pump to said valve and for returning fluid from said valve to the intake side of the pump, motor passages associated with said valve for being connected to the fluid ports of said hydraulic motor, said valve having a valve member movable to operating positions for selectively connecting the fluid ports of said motor to the intake and outlet sides of said pump for operating said motor in opposite directions and to hold position in which the flow of fluid between said pump and said motor is prevented, by-pass means for connecting said motor passages on the motor side of said control valve having provision for preventing any flow of fluid therethrough or permitting fluid to flow in either direction therethrough, said means normally being retained in closed position and being adapted automatically to open under predetermined load conditions when the valve member is in operating position to permit the flow of fluid in either direction therethrough from the then discharge opening of said motor to the other opening thereof without passing through said pressure passageway.

20. Fluid pressure control apparatus for a hydraulic system including a double acting hydraulic motor having a pair of fluid ports and a pump, a control valve, pressure and relief passages for supplying fluid from the outlet side of the pump to said valve and for returning fluid from said valve to the intake side of the pump, motor passages associated with said valve for being connected to the fluid ports of said hydraulic motor, said valve having a valve member movable to operating positions for selectively connecting the fluid ports of said motor to the intake and outlet sides of said pump for operating said motor in opposite directions and to hold position in which the flow of fluid between said pump and said motor is prevented, by-pass means for connecting said motor passages on the cylinder side of said control valve including pressure responsive valves for being actuated to prevent any flow of fluid through said by-pass or to permit fluid to flow in either direction therethrough, said pressure responsive valves normally being retained in closed position and being adapted automatically to be operated to open positions under abnormal load conditions when the control valve is in operating position to permit the flow of fluid in either direction therethrough from the then discharge opening of said motor to the other opening thereof without passing through said pressure passageway.

21. A control valve for a hydraulic system including a hydraulic motor having a pair of fluid ports, a fluid reservoir having pressure actuated valves for controlling the flow of fluid thereto and therefrom, and a pump, said control valve comprising a casing having a bore therein, pressure and relief passages in said casing for supplying fluid from the outlet side of said pump to said bore and returning fluid to the intake side of said pump, motor passages in said casing intersecting said bore for being connected to the fluid ports of said motor, a valve member in said bore movable to operating positions for selectively connecting the fluid ports of said motor to the intake and outlet sides of said pump and to hold position in which the flow of fluid between said pump and said motor is prevented, a by-pass passageway in said casing for communicating with said pressure actuated valves and having valve means for connecting said motor passages on the motor side of said control valve member, said valve means normally being retained in closed position and being operable to open position responsive to predetermined pressure differences on opposite sides to permit the flow of fluid from said reservoir to the relatively low pressure motor passageway although said valve member is in hold position.

HARVEY W. ROCKWELL.

REFERENCES CITED

The following references are of record in the file of this patent:

UNITED STATES PATENTS

| Number | Name | Date |
|---|---|---|
| 833,931 | Johnson | Oct. 23, 1906 |
| 1,588,656 | Christensen | June 15, 1926 |
| 1,588,659 | Christensen | June 15, 1926 |
| 1,725,489 | Stratton | Aug. 20, 1929 |
| 2,109,668 | Johnston | Mar. 1, 1938 |
| 2,153,056 | West | Apr. 4, 1939 |
| 2,210,144 | Day | Aug. 6, 1940 |
| 2,226,192 | Barrett | Dec. 24, 1940 |
| 2,247,140 | Twyman | June 24, 1941 |
| 2,267,284 | Livers | Dec. 23, 1941 |
| 2,367,682 | Kehle | Jan. 23, 1945 |
| 2,377,278 | Stephens | May 29, 1945 |